(12) United States Patent  
Garrett (10) Patent No.: US 9,967,616 B2  
(45) Date of Patent: May 8, 2018

(54) METHOD AND SYSTEM FOR PRIORITY-BASED DIGITAL MULTI-STREAM DECODING

(71) Applicant: Avago Technologies General IP (Singapore) Pte. Ltd., Singapore (SG)

(72) Inventor: Jon Daniel Garrett, San Marcos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 598 days.

(21) Appl. No.: 14/519,860

(22) Filed: Oct. 21, 2014

(65) Prior Publication Data

US 2015/0036755 A1 Feb. 5, 2015

Related U.S. Application Data

(63) Continuation of application No. 12/192,065, filed on Aug. 14, 2008, now Pat. No. 8,867,622.

(51) Int. Cl.
*H04N 21/438* (2011.01)
*H04N 21/426* (2011.01)
(Continued)

(52) U.S. Cl.
CPC ......... *H04N 21/4382* (2013.01); *H04N 19/44* (2014.11); *H04N 21/42615* (2013.01);
(Continued)

(58) Field of Classification Search
CPC ........... H04N 7/26127; H04N 7/26223; H04N 7/26271; H04N 7/26313; H04N 7/50; H04N 21/4347; H04N 21/4532

See application file for complete search history.

(56) References Cited

U.S. PATENT DOCUMENTS 6,233,734 B1    5/2001  Macrae et al.
7,123,658 B2 *  10/2006 Krishnamachari .... H04N 19/51
                                                       348/416.1

(Continued)

FOREIGN PATENT DOCUMENTS

JP          11168701 A       6/1999

OTHER PUBLICATIONS

Non-Final Office Action for U.S. Appl. No. 12/192,065, dated Jan. 19, 2012.

(Continued)

*Primary Examiner* — Mounir Moutaouakil
(74) *Attorney, Agent, or Firm* — Foley & Lardner LLP (57) ABSTRACT

Aspects of a method and system for priority-based digital multi-stream decoding. A multi-stream decoder may be enabled to decode and present multiple streams of a multi-stream multimedia application, simultaneously. The multi-stream decoder may be enabled to determine a priority level for each of the received multiple streams of the multimedia application. A high-priority stream may be decoded and presented at a high frame rate and a relative high resolution level, while a lower-priority stream may be decoded and presented at a low frame rate and a relative low resolution level. The decoded frames may be presented in a picture-in-picture format. The priority level for each of the received multiple streams may depend on user input, a user profile, and/or a display capability.

18 Claims, 4 Drawing Sheets

(51) Int. Cl.
*H04N 21/43* (2011.01)
*H04N 21/431* (2011.01)
*H04N 21/434* (2011.01)
*H04N 21/4402* (2011.01)
*H04N 21/45* (2011.01)
*H04N 21/454* (2011.01)
*H04N 21/462* (2011.01)
*H04N 21/84* (2011.01)
*H04N 19/44* (2014.01)

(52) U.S. Cl.
CPC ..... *H04N 21/4307* (2013.01); *H04N 21/4316* (2013.01); *H04N 21/4347* (2013.01); *H04N 21/440218* (2013.01); *H04N 21/454* (2013.01); *H04N 21/4516* (2013.01); *H04N 21/4532* (2013.01); *H04N 21/4621* (2013.01); *H04N 21/84* (2013.01)

(56) References Cited

U.S. PATENT DOCUMENTS

| | | | |
|---|---|---|---|
| 7,768,576 B2 | 8/2010 | Yui et al. | |
| 8,065,614 B2* | 11/2011 | Ma | G06F 3/0481 345/501 |
| 8,181,079 B2 | 5/2012 | Gorokhov et al. | |
| 8,184,944 B2* | 5/2012 | Ogawa | G11B 27/034 386/241 |
| 2001/0022789 A1* | 9/2001 | Huang | H04B 7/2612 370/468 |
| 2004/0201608 A1* | 10/2004 | Ma | G06F 3/0481 715/719 |
| 2005/0177853 A1 | 8/2005 | Williams et al. | |
| 2006/0171600 A1* | 8/2006 | Kikuchi | G11B 27/005 382/232 |
| 2006/0268871 A1* | 11/2006 | Van Zijst | H04L 12/1836 370/390 |
| 2007/0001512 A1 | 1/2007 | Sato et al. | |
| 2007/0121720 A1 | 5/2007 | Yamane et al. | |
| 2008/0271080 A1 | 10/2008 | Gossweiler et al. | |
| 2009/0028151 A1* | 1/2009 | Schmidt | H04L 47/10 370/392 |
| 2009/0052578 A1 | 2/2009 | Sawai | |
| 2009/0210317 A1 | 8/2009 | Fox et al. | |
| 2010/0153999 A1* | 6/2010 | Yates | H04N 5/44543 725/39 |
| 2010/0174931 A1 | 7/2010 | Clarke et al. | |
| 2010/0329263 A1 | 12/2010 | Tischer et al. | |
| 2011/0231867 A1 | 9/2011 | Williams et al. | |
| 2014/0344392 A1* | 11/2014 | Ozawa | H04N 21/6131 709/213 |

OTHER PUBLICATIONS

Final Office Action for U.S. Appl. No. 12/192,065, dated Aug. 24, 2012.

Non-Final Office Action for U.S. Appl. No. 12/192,065, dated Nov. 5, 2013.

Final Office Action for U.S. Appl. No. 12/192,065, dated Mar. 20, 2014.

Notice of Allowance for U.S. Appl. No. 12/192,065, dated Jun. 18, 2014.

* cited by examiner

METHOD AND SYSTEM FOR PRIORITY-BASED DIGITAL MULTI-STREAM DECODING

CROSS-REFERENCE TO RELATED APPLICATIONS/INCORPORATION BY REFERENCE

This application is a continuation of and claims priority to and the benefit of U.S. application Ser. No. 12/192,065, entitled "Method and System for Priority-Based Digital Multi-Stream Decoding," filed on Aug. 14, 2008, the contents of which are herein incorporated by reference in their entirety for all purposes.

FIELD OF THE INVENTION

Certain embodiments of the invention relate to signal processing. More specifically, certain embodiments of the invention relate to a method and system for priority-based digital multi-stream decoding.

BACKGROUND OF THE INVENTION

Various multimedia applications such as IPTV, or Internet-Based TV broadcasting is going to significantly change the way people obtain information, get entertainment, and possibly collaborate with each other. For example, viewers of a multimedia decoding device such as a TV may select multiple channels and view associated programs in a customized manner. The programs may typically be provided to the viewers via transport streams within a transmission signal. There may be multiple programs within a single transport stream and multiple transports streams within the transmission signal. The multimedia decoding device may be capable of receiving multiple data streams, decoding and displaying the received multiple data streams simultaneously.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for priority-based digital multi-stream decoding, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for priority-based digital multi-stream decoding. Various aspects of the invention may enable a multi-stream decoder to receive multiple streams of a multi-stream multimedia application. The multi-stream decoder may be enabled to determine a priority level for each of the received multiple streams of the received multimedia application. Frames associated to each of the received multiple streams may be decoded and presented in a frame rate that may depend on a corresponding priority level of the streams. A high-priority stream may be decoded and presented at a high frame rate and a relative high resolution level, while a lower-priority stream may be decoded and presented at a low frame rate and a relative low resolution level. The decoded frames may be presented in a picture-in-picture format. The priority level for each of the received multiple streams may depend on user input such as program selection, a user profile such as viewer settings, and corresponding device display capability. A size and/or a position for a presented stream may be determined based on corresponding determined priority level.

Figure 1:
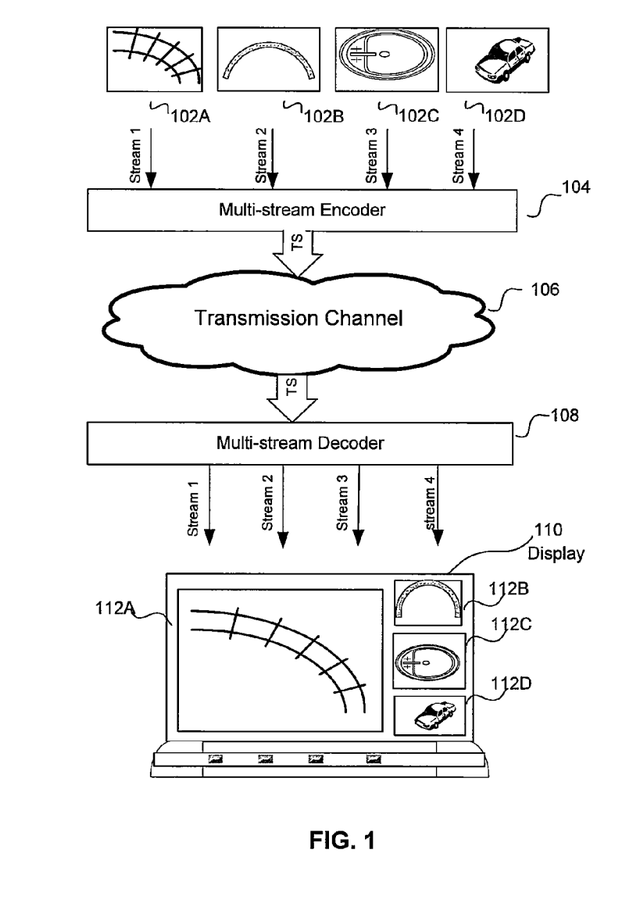
FIG. 1 is a diagram illustrating an exemplary multimedia system supporting multi-stream decoding, in accordance with an embodiment of the invention.

FIG. 1 is a diagram illustrating an exemplary multimedia system supporting multi-stream decoding, in accordance with an embodiment of the invention. Referring to FIG. 1, there is shown a plurality of source video streams, of which videos 102A, 102B, 102C, and 102D may be illustrated, a multi-stream encoder 104, a transmission channel 106, a multi-stream decoder 108, and a display 110.

The source data streams such as 102A through 102D may comprise suitable logic, circuitry and/or code that may provide data streams from, for example, a camcorder, VCR, CCD camera, or from an Internet video stream. It is understood that source data streams to the multi-stream encoder 104 may comprise video data, audio data, audio/video data and text data.

The multi-stream encoder 104 may comprise suitable logic, circuitry and/or code that may be operable to encode multiple multimedia signals simultaneously. The multi-stream encoder 104 may be enabled to compress each of multiple multimedia signals into a perspective elementary stream (ES). Depending on implementation, the resulted ESs may form one or more transport streams (TSs) for transmission. The compression methods used may depend on the type of the source data stream such as the video stream 102A.

The transmission channel 106 may comprise suitable logic, circuitry and/or code that may enable data communication via wired and/or wireless technologies. Various techniques may be utilized over the transmission channel 106. By way of example, data may be communicated over the transmission channel 106 via frequency division multiple access (FDMA) techniques, time division multiple access (TDMA) techniques, code division multiple access (CDMA) techniques, other techniques, or various combinations of such techniques.

The multi-stream decoder 108 may comprise suitable logic, circuitry and/or code that may be enabled to receive multiple data streams of a multimedia application and reconstruct multiple multimedia frames simultaneously from the received multiple data streams. The multi-stream decoder 108 may be enabled to determine and assign a priority level for each of the received multiple data streams. The frames associated with each of the received multiple data streams may be scheduled to be decoded in a frame rate determined by the corresponding stream priority level. The frames associated with a high-priority stream may be decoded in a high frame rate and presented to viewers with a high resolution level while frames associated with a lower-priority stream may be decoded in a lower frame rate and displayed with a lower resolution level. The stream priority levels of the received multiple streams may be determined based on a user configuration profile and/or on decoder frame buffer status. The user configuration may comprise user selections of program-specific parameters such as, for example, program type, acceptable display window sizes, acceptable resolution levels, and acceptable frame rates. The user selections may be made via a user interface, which may comprise, for example, an alphanumeric keypad, touch screen, voice recognition, or the like. The user interface may be communicatively coupled to the multi-stream decoder 108 or the display 110 to drive the multi-stream decoder 108 to determine/adjust priorities of the received multiple streams in response to the user input from the user interface. With priority-based decoding, the multi-stream decoder 108 may take advantage of the available bandwidth to ensure a maximum picture quality for high-priority streams. The multi-stream decoder 108 may allocate guaranteed bandwidth to a high-priority stream. The high-priority stream may be decoded and displayed at a full frame rate with a resolution preserving a maximum picture quality. Lower-priority streams may then scavenge the remaining bandwidth to be displayed at a reduced frame rate to the user.

The display 110 may comprise suitable logic, circuitry and/or code that may be used to display contents of decoded data streams from multi-stream decoder 108. The display 110 may be enabled to facilitate the simultaneous presentation of decoded data streams associated with two or more programs, for example, the decoded video streams 112A through 112D. The display 110 may be configured to display multiple decoded data streams in various ways. For example, the display screen of the display 110 may be divided into various views, each of which may present multimedia streams associated with a different program. A user may be able to define the size, shape, and positioning of the windows associated to each view. Each view may present a low-resolution/low frame rate or a high-resolution/high frame rate sequence based on priorities for the different programs. A user may be able to select a program of interest. Following the selection, the selected program may be presented at the high frame rate with a high resolution level.

In operation, a multi-stream application such as a picture-in-picture application may require various multimedia contents such as the video streams 102A through 102D to be encoded simultaneously at the multi-stream encoder 104. The encoded video streams may be delivered as a series of programs over the transmission channel 106 to the multi-stream decoder 108. The multi-stream decoder 108 may determine a priority level for each of receive video streams. The frames for the received video streams may be scheduled to be decoded in a frame rate based on the determined stream priority levels. The frames associated with a high-priority video stream may be decoded with guaranteed bandwidth to ensure a better picture quality, while frames of lower-priority video streams may be decoded with a reduced bandwidth and displayed in a reduced frame rate with a preserved resolution at the display 110. The priority levels of the received video streams may depend on various exemplary factors comprising configuration, program type, and/or coded frame buffer status of the multi-stream decoder 108.

Figure 2:
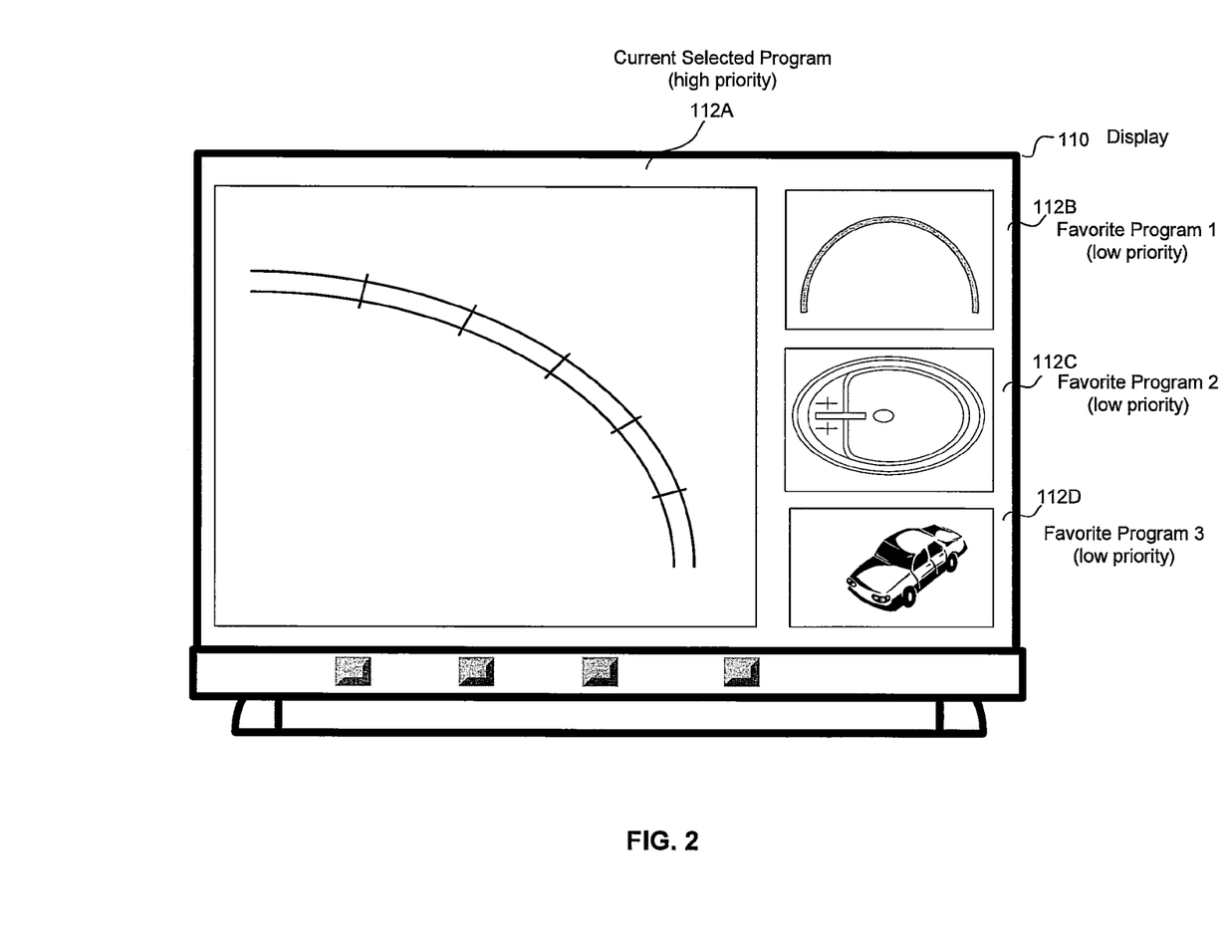
FIG. 2 is a diagram illustrating an exemplary display, in accordance with an embodiment of the invention.

FIG. 2 is a diagram illustrating an exemplary display, in accordance with an embodiment of the invention. Referring to FIG. 2, there is shown an exemplary front view of the display 110 presenting frames associate to multiple video streams simultaneously. In particular, the display 110 may be configured to simultaneously present various stream priority dependent video frames such as 112A through 112D. The screen of the display 110 may be divided into different views to enable viewers to watch multiple programs at the same time. For example, a viewer may keep an eye on various favorite programs such as 112B, 112C, and 112D while watching the current selected program such as 112A. The sizes, shapes, and positions of the views may be defined by viewers. For example, the current selected program such as the stream 112A, which may be decoded with guaranteed bandwidth, may be rendered in a large window on the screen at a high resolution and high frame rate, while other lower-priority programs such as the streams 112B, 112C, and 112D, which may be decoded with a reduced bandwidth, may be displayed at the low resolution and low frame rate in smaller windows.

Figure 3:
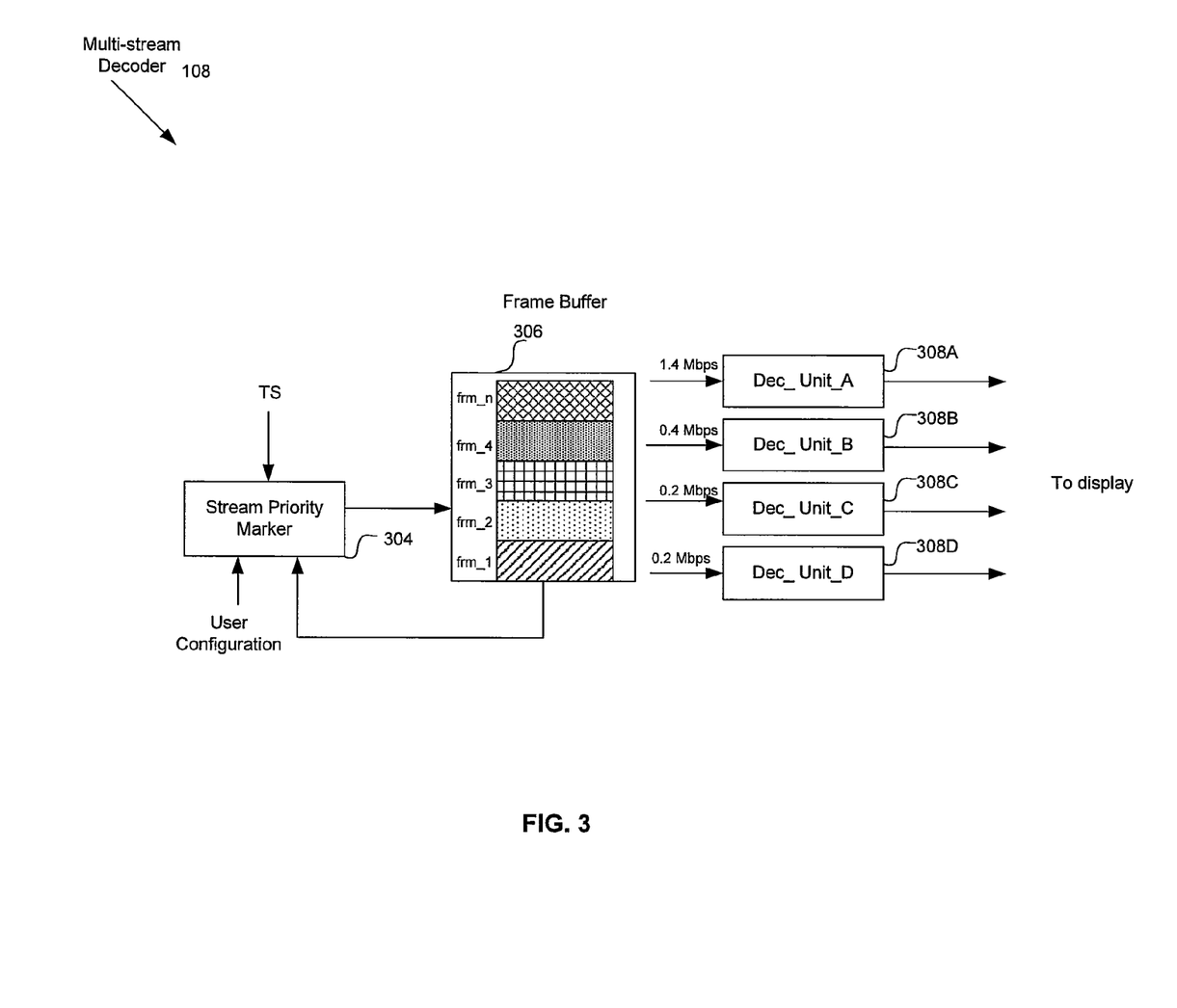
FIG. 3 is a diagram illustrating an exemplary multi-stream decoder, in accordance with an embodiment of the invention.

FIG. 3 is a diagram illustrating an exemplary multi-stream decoder, in accordance with an embodiment of the invention. Referring to FIG. 3, there is shown a stream priority marker 304, a frame buffer 306, a plurality of decoding units, of which a dec_unit_A 308 A, a dec_unit_B 308B, a dec_unit_C 308C, and a dec_unit_D 308D may be illustrated.

The stream priority marker 304 may comprise suitable logic, circuitry and/or code that may be enabled to identify each of the multiple streams of a multi-stream multimedia application and determine a priority level for each of the multiple streams. The priority level of a stream may be decided based on user configuration such as program selection, program viewing settings, and the buffer level status of the coded frame buffer 306. The stream priority marker 304 may mark various frames associated to the stream with corresponding stream priority level and pass to the coded frame buffer 306.

The frame buffer 306 may comprise suitable logic, circuitry and/or code that may be used to compensate for delay variations that may be associated with incoming (coded) frames. The size of the frame buffer 306 may depend on, for example, a size of a statistical bound of the delay variations. This bound may be chosen depending on, for example, a maximum tolerated delay of the system and the packet loss rate. For each stream of the multi-stream application, the frame buffer 306 may be enabled to schedule frames associated with the respective stream to be decoded in a frame rate determined by the corresponding stream priority level. For example, frames associated to a stream with a high-priority level may be passed to, for example, the dec_unit_A 308A to be decoded at a full frame rate while frames associated to a stream with a lower-priority level may be passed to the dec_unit_B 30B to be decoded at a reduced frame rate.

The decoding units such as the dec_unit_A 308 A through the dec_unit_D 308D may comprise suitable logic, circuitry and/or code that may be used to reconstruct frames from, for example, various encoded video frames. The decoding units may be instructed to decode encoded video frames from the frame buffer 306 at a given bandwidth such as, for example, 1.4 Mbps or 0.4 Mbps. The resulted decoded video frames from the decoding units may be passed to the display 110.

In operation, the multi-stream decoder 108 may receive multiple streams associated to a multi-stream multimedia application. Each of the received streams may be assigned a stream priority level determined at the stream priority marker 304. The stream priority marker 304 may use information such as user configuration and the buffer level status of the frame buffer 306 for the determinations of corresponding stream priority levels. The frame buffer 306 may schedule frames associated with the perspective stream to be decoded in a frame rate determined by the corresponding stream priority level. Frames of a high-priority stream may be decoded at a full frame rate while frames of a lower-priority stream may be decoded at a reduced frame rate. The decoded frames from the decoding units may be passed to the display 110 to present to viewers.

Figure 4:
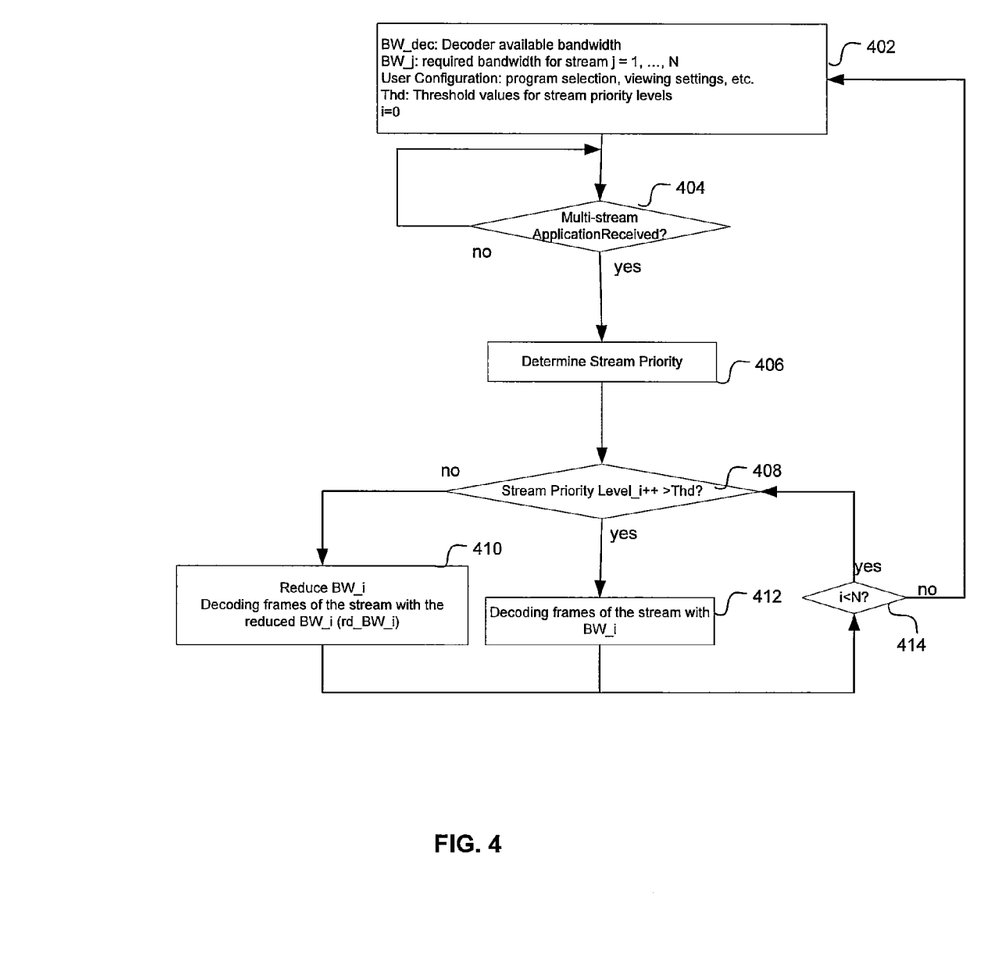
FIG. 4 is an exemplary flow diagram illustrating techniques that facilitate priority-based multi-stream decoding, in accordance with an embodiment of the invention.

FIG. 4 is an exemplary flow diagram illustrating techniques that facilitate priority-based multi-stream decoding, in accordance with an embodiment of the invention. Referring to FIG. 4, the exemplary steps may begin with step 402, where the multi-stream decoder 108 may be enabled to decode and display multiple streams of a multimedia application simultaneously. BW_dec may be the decoder available bandwidth. BW_j, j=1, ... , N, may be the required bandwidth BW_j for the stream j of the total N multiple streams of the multimedia application. User configuration may comprise information such as program selection and viewing settings. Thd may be the stream priority level threshold and i is a variable for stream index.

In step 404, it may be determined whether the multi-stream decoder 108 may receive multiple streams of a multimedia application. In instances where the multiple streams associated with the multimedia application may be received at the multi-stream decoder 108, then in step 406, the stream priority level for each of received multiple streams of the multimedia application may be determined. The determination may be done by the stream priority marker 304 based on exemplary information such as the stream type, user configuration like program selection, and/or the buffer level status of the coded frame buffer 306. In step 408, the determined stream priority level for the stream i, where i=1, ... , N, may be compared to the threshold Thd. In instances where the determined stream priority level for the stream i may be greater than Thd, then in step 412, decoding frames of the stream i with BW_i.

In step 414, it may be determined whether each of the multiple streams of the received multimedia application may be evaluated for bandwidth allocation. In instances where bandwidth allocation for the multiple streams of the received multimedia application may not be complete, then the exemplary steps may go back to step 408. In step 404, in instances where the multiple streams associated with a multimedia application may not be received at the multi-stream decoder 108, then the exemplary steps may stay in step 404. In step 408, in instances where the determined stream priority level for the stream i may be less than or equal to Thd, then in step 410, the bandwidth allocated to the stream i may be reduced and frames associated to the stream i may be decoded by using the reduced bandwidth for the stream i. The bandwidth allocated to the stream i may be constrained by the total required decoding bandwidth for each of the multiple streams of the multimedia application not exceeding the decoder available bandwidth BW_dec. Then go to step 414. In step 414, in instances where bandwidth allocation for the multiple streams of the received multimedia application may be complete, then the exemplary steps may return to step 402 for a new multi-stream multimedia application.

Aspects of a method and system for priority-based digital multi-stream decoding are provided. In accordance with various embodiments of the invention, the multi-stream decoder 108 may be enabled to receive multiple streams such as video 102A, 102B, 102C, and 102D of a multi-stream multimedia application. The multi-stream decoder 108 may comprise the stream priority marker 304 to determine a priority level for each of the received multiple streams of the received multimedia application. Frames associated with each of the received multiple streams may be decoded at various decoding units such as the Dec_Unit_A 308A and presented at the display 110 in a frame rate depend on corresponding priority level. As described in FIG. 4, a high-priority stream may be decoded and presented at a high frame rate and a relative high resolution level, while a lower-priority stream may be decoded and presented at a low frame rate and a relative low resolution level. The decoded frames may be presented in a picture-in-picture format as shown in FIG. 2. The priority level for each of the received multiple streams may depend on user input such as program selection, a user profile such as viewer settings, and corresponding device display capability such as status of the frame buffer 306. A size and/or a position for a presented stream may be determined based on corresponding determined priority level.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for priority-based digital multi-stream decoding.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing data, the method comprising:
receiving, by a decoder having a fixed total decoding bandwidth, a multiplexed stream of multimedia data comprising a first received stream of multimedia data, a second received stream of multimedia data, and a third received stream of multimedia data;
assigning, by the decoder, a first priority level to the first received stream of multimedia data, a second priority level, lower than the first priority level, to the second received stream of multimedia data, and a third priority level, lower than the second priority level, to the third received stream of multimedia data;
determining, by the decoder, that the first priority level exceeds a threshold and that the second priority level and third priority level do not exceed the threshold;
decoding, by the decoder, a first frame associated with the first received stream with a first bandwidth allocation, responsive to the determination that the first priority level exceeds the threshold;
dividing a remaining bandwidth allocation between the second received stream and third received stream according to the second priority level and third priority level, by the decoder responsive to the determination that the second priority level and third priority level do not exceed the threshold, the remaining bandwidth allocation equal to a difference between the fixed total decoding bandwidth and the first bandwidth allocation;
decoding, by the decoder, a second frame associated with the second received stream at a second, lower bandwidth allocation and a third frame associated with the third received stream at a third bandwidth allocation lower than the second bandwidth allocation; and
providing the decoded first frame associated with the first received stream, the decoded second frame associated with the second received stream, and the decoded third frame associated with the third received stream, by the decoder, based on the corresponding assigned priority levels.

2. The method of claim 1, wherein decoding the first frame further comprises decoding the first frame associated with the first received stream at a decoder bandwidth required to decode the first frame at a full resolution or full frame rate; and wherein decoding the second frame further comprises decoding the second frame associated with the first received stream at a remaining decoder bandwidth.

3. The method of claim 1, further comprising decoding the first frame associated with the first received stream of multimedia data at a frame rate or resolution based on the assigned first priority level.

4. The method of claim 1, further comprising decoding the second frame associated with the second received stream of multimedia data at a frame rate reduced from an original frame rate of the second received stream of multimedia data or resolution reduced from an original resolution of the second received stream of multimedia data based on the assigned second priority level.

5. The method of claim 1, further comprising providing the decoded second frame associated with the second received stream of multimedia data in a sub-window of a picture-in-picture format.

6. The method of claim 5, further comprising providing the decoded first frame associated with the first received stream of multimedia data in a main window of a picture-in-picture format.

7. The method of claim 1, wherein assigning the first priority to the first received stream is based on a selected size, shape, or position of the graphical presentation of the decoded first frame associated with the first received stream.

8. The method of claim 1, wherein assigning the first priority to the first received stream is based on a user profile comprising viewer settings relating to presentation of the decoded first frame associated with the first received stream.

9. The method of claim 1, wherein assigning the first priority to the first received stream is based on a display capability available for presenting the first received stream.

10. A system for processing data, comprising:
a decoder, having a fixed total decoding bandwidth, configured to:
receive a multiplexed stream of multimedia data comprising a first received stream of multimedia data, a second received stream of multimedia data, and a third received stream of multimedia data,
assign a first priority level to the first received stream of multimedia data, a second priority level, lower than the first priority level, to the second received stream of multimedia data, and a third priority level, lower than the second priority level, to the third received stream of multimedia data,
determine that the first priority level exceeds a threshold and that the second priority level and third priority level do not exceed the threshold,
decode a first frame associated with the first received stream with a first bandwidth allocation, responsive to the determination that the first priority level exceeds the threshold,
divide a remaining bandwidth allocation between the second received stream and third received stream according to the second priority level and third priority level, responsive to the determination that the second priority level and third priority level do not exceed the threshold, the remaining bandwidth allocation equal to a difference between the fixed total decoding bandwidth and the first bandwidth allocation,
decode a second frame associated with the second received stream at a second, lower bandwidth allocation and a third frame associated with the third received stream at a third bandwidth allocation lower than the second bandwidth allocation, and
provide the decoded first frame associated with the first received stream, the decoded second frame associated with the second received stream, and the decoded third frame associated with the third received stream, based on the corresponding assigned priority levels.

11. The system of claim 10, wherein the decoder is further configured to decode the first frame associated with the first received stream at a decoder bandwidth required to decode the first frame at a full resolution or full frame rate; and decode the second frame associated with the first received stream at a remaining decoder bandwidth.

12. The system of claim 10, wherein the decoder is further configured to decode the first frame associated with the first received stream of multimedia data at a frame rate or resolution based on the assigned first priority level.

13. The system of claim 10, wherein the decoder is further configured to decode the second frame associated with the second received stream of multimedia data at a frame rate reduced from an original frame rate of the second received stream of multimedia data or resolution reduced from an original resolution of the second received stream of multimedia data based on the assigned second priority level.

14. The system of claim 10, wherein the decoder is further configured to provide the decoded second frame associated with the second received stream of multimedia data in a sub-window of a picture-in-picture format.

15. The system of claim 14, wherein the decoder is further configured to provide the decoded first frame associated with the first received stream of multimedia data in a main window of a picture-in-picture format.

16. The system of claim 10, wherein the decoder is further configured to assign the first priority to the first received stream based on a selected size, shape, or position of the graphical presentation of the decoded first frame associated with the first received stream.

17. The system of claim 10, wherein the decoder is further configured to assign the first priority to the first received stream based on a user profile comprising viewer settings relating to presentation of the decoded first frame associated with the first received stream.

18. The system of claim 10, wherein the decoder is further configured to assign the first priority to the first received stream is based on a display capability available for presenting the first received stream.

\* \* \* \* \*